(12) United States Patent
Colle et al.

(10) Patent No.: US 9,766,779 B2
(45) Date of Patent: Sep. 19, 2017

(54) DYNAMIC VALIDATION OF SELECTABLE DATA

(71) Applicant: MICROSOFT CORPORATION, Redmond, WA (US)

(72) Inventors: Audrey C. Colle, Bellevue, WA (US); Charles Travis Scott Haberman, Kirkland, WA (US); Jason A. Dujardin-Terry, Kent, WA (US); Seak Fei Lei, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 560 days.

(21) Appl. No.: 13/794,257

(22) Filed: Mar. 11, 2013

(65) Prior Publication Data

US 2014/0258930 A1    Sep. 11, 2014

(51) Int. Cl.
*G06F 3/048* (2013.01)
*G06F 3/0482* (2013.01)
*G06F 17/30* (2006.01)

(52) U.S. Cl.
CPC ...... *G06F 3/0482* (2013.01); *G06F 17/30398* (2013.01); *G06F 17/30994* (2013.01)

(58) Field of Classification Search
None
See application file for complete search history.

(56) References Cited

U.S. PATENT DOCUMENTS

| | | | |
|---|---|---|---|
| 6,477,536 B1 | 11/2002 | Pasumansky et al. | |
| 6,775,675 B1 | 8/2004 | Nwabueze et al. | |
| 7,587,416 B2 | 9/2009 | Burns, III et al. | |
| 8,024,287 B2 | 9/2011 | Abouzied et al. | |
| 8,219,547 B2 | 7/2012 | Joseph et al. | |
| 8,296,287 B1 | 10/2012 | Cappiello et al. | |
| 2008/0250352 A1* | 10/2008 | Zaliva | 715/816 |
| 2010/0312748 A1 | 12/2010 | Dickerman et al. | |

(Continued)

OTHER PUBLICATIONS

"ActiveReports .NET Reporting and Business Intelligence Tools for .NET, Azure, Silverlight", Published on: Nov. 17, 2010, Available at: http://www.activereportsblog.com/2010/11/activeanalysis-ssas-olap-client.html.

(Continued)

*Primary Examiner* — William Trapanese
(74) *Attorney, Agent, or Firm* — Shook, Hardy & Bacon L.L.P.

(57) ABSTRACT

In various embodiments, methods and systems for dynamic validation of selectable data are provided. This may be accomplished by receiving a selection of an item such that preview interface elements associated with the validity of the selection are dynamically presented via an interface. The received preview-selected item is validated based on determining whether the preview-selected item and a set of one or more selected items are valid for a computation involving both the preview-selected item and the set of the one or more selected items. Upon determining that the preview-selected item is not combinable with at least one selected item in the set of one or more selected items, a preview interface element associated with the at least one selected item is provided for display such that an anticipated effect of executing a full selection of the preview-selected item is dynamically previewed.

20 Claims, 6 Drawing Sheets

(56) References Cited

U.S. PATENT DOCUMENTS

2011/0093487 A1     4/2011    Le Biannic et al.
2011/0231359 A1     9/2011    Lerwich et al.
2011/0276918 A1*   11/2011   Bennett ................ G06F 9/4446
                                                                            715/808

OTHER PUBLICATIONS

"Complex-Event Processing (CEP) Explained for Microsoft BizTalk Users", Retrieved on: Feb. 5, 2013, Available at: http://geekswithblogs.net/cyoung/archive/2009/05/18/cep_explained_for_biztalk_users.aspx.

"Analysis Services 2005 Migration", Retrieved on: Feb. 5, 2013, Available at: http://technet.microsoft.com/en-us/library/cc917610.aspx.

"Use cube partitions to improve Analysis Services performance", Retrieved on: Feb. 5, 2013, Available at: http://searchsqlserver.techtarget.com/tip/Use-cube-partitions-to-improve-Analysis-Services-performance.

"Combining Multiple Data Sources into One View", Retrieved on: Feb. 5, 2013, Available at: http://kb.tableausoftware.com/articles/knowledgebase/multiple-sources-one-worksheet.

"SQL Server Developers", Retrieved on: Feb. 5, 2013, Available at: https://www.elance.com/d/wd/sql-server/4.

* cited by examiner

DYNAMIC VALIDATION OF SELECTABLE DATA

BACKGROUND

Users utilize various types of database systems for data analysis. A multidimensional database system, with several multidimensional cubes, may be used for business-intelligence queries. A user may use data integration methods to combine different cubes to perform reporting. However, the selected data from the cubes may not be immediately apparent to the user as valid or invalid combinations of the selected data.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide a method and system for dynamic validation of selectable data. This may be accomplished by receiving a selection of an item such that preview interface elements associated with the validity of the selection are dynamically presented via an interface. The received preview-selected item is validated based on determining whether the preview-selected item and a set of one or more selected items are valid for a computation involving both the preview-selected item and the set of one or more selected items. Upon determining that the preview-selected item is not combinable with at least one selected item in the set of one or more selected items, a preview interface element associated with the at least one selected item is provided for display such that an anticipated effect of executing a full selection of the preview-selected item is dynamically previewed.

BRIEF DESCRIPTION OF THE DRAWINGS

The present invention is described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, "a feature" is satisfied where one or more features are present. Also, the term "or" includes the conjunctive, the disjunctive and both (a or b thus includes either a or b, as well as a and b).

For purposes of a detailed discussion below, embodiments of the present invention are described with reference to a data validation process in the context of the generating custom reports using dimensions and measures. Further, while embodiments of the present invention may generally refer to custom reporting using cubes and the components described herein, it is understood that the techniques described may be extended to other implementations contexts.

Data validation may refer to the process of ensuring that a computing system operates on correct or useful data. Data validation may use validation rules or check routines that check for correctness of an input into the computer system. The validation rules may be automated and applied using validation logic. At a basic level, data validation verifies that a selection provided is valid. The validation process may include distinct validation steps, for example, users make selections for a combination of items, and after all the selections are made, an error message is generated based on identifying an invalid selection. Unfortunately, the user is not made aware of the invalidity of their selections until after the selections are made. It would be advantageous to have a process that proactively and dynamically, within a user interface, informs a user of the potential invalidity of selections, so that the user may be immediately aware of the correctness of their input. For example, database systems, with multidimensional datasets that are used for data interpretation, may be validated during a data selection process using such a dynamic interface with interface elements.

An exemplary database system may be the Online Analytical Processing (OLAP) database that facilitates business-intelligence queries using data integration. Data integration involves combining data residing in different sources and providing users with a unified view of these data. Data integration may be commercial (e.g., when two similar companies need to merge their databases) and scientific (e.g., combining research results from different bioinformatics repositories, for example) domains. Data integration may also be simply a by-product of the infrastructure of a single entity storing a datasets in a plurality of cubes. Conceiving data as a cube with hierarchical dimensions leads to conceptually straightforward operation to facilitate analysis. A cube may be a data structure that aggregates measures by levels and hierarchies of each dimension. The dimension may be a set of one or more organized hierarchies of levels in a cube e.g., geography that include levels, for example, Country/Region. The measures in each cube may be the set of values in a cube and are preprocessed, aggregated, and analyzed.

Cubes combine several different dimensions and measures in multidimensional cubes. Multidimensional cubes may be used in multidimensional data queries or the creation of reports. The dimensions of a cube may be stored in a database table. For example, a cube may include a Customer, Product, and Time dimension that would allow a query by customer, by time, and by product. Cube datasets may be configured to limit the storage size of individual cubes, which may lead to a plurality of sibling cubes sharing the same or related datasets. In operation, performing cube analysis on several cubes may be based in part on familiarity with different cube dimensions that are arranged over a plurality of sibling cubes and also knowing valid combinations of cube dimensions and measures across the dataset. Cube analysis would be advantageously more productive with an automated process and interface for validation of the multidimensional datasets.

In multidimensional cube analysis, the dimensions associated cubes are used to track data and to define the filter criteria for queries used in reporting. Custom reports may be useful in combining dimensions and measures that may not be available in predefined standard reports. A user may generate custom reports to bring in relevant measures and dimensions from multiple cubes into one place. This may allow for analysis to an individual business model. In a multidimensional dataset including a plurality of cubes, not all dimensions and measures may be reported on together, requiring the user to be familiar with different cube dimensions and measures to make valid combinations for custom reporting. Certain user selections for combinations may be valid while other selections for combinations may be invalid. An algorithm and an interactive interface may be provided to dynamically and visually determine valid combinations and invalid combinations of dimensions and measures in reporting, filtering, and selecting options for the dataset. A validation algorithm may be used in the validation process in combination with interface elements dynamically presented on a display. As such, the validation process provides a way of quickly and interactively identifying valid and invalid combinations of multidimensional datasets in cubes.

Embodiments of the present invention provide a simple and efficient method for validating selectable data in a seamless intuitive way via an interface. In particular, validating cube combinations through an interface interacting with a plurality of cubes. A validation component may include both the algorithms to automatically provide validation analysis of cube dimensions and measures and a user interface that visually and interactively provides validation of dimensions selected for analysis. The validation component handles processing multidimensional datasets using algorithms and presenting multidimensional datasets using an interactive interface. The validation component may be incorporated in an abstraction layer. The abstraction layer may hide the implementation details of the validation component. For example, the abstraction layer may include a library or API that provides the specific implementation of the validation process based on the algorithm and the interface. As such, the abstraction layer libraries and APIs of the validation component having algorithm and interface functions provide flexibility in interacting with the plurality of cubes. It is contemplated within the scope of embodiments of the present invention that the validation process described herein may be implemented in other cases where the validation of selectable data is performed using a dynamic interface.

Accordingly, in a first aspect of the present invention, one or more computer-readable media storing computer-useable instructions that, when used by one or more computing devices, cause the one or more computing devices to perform a method for dynamic validation of selectable data. The method includes receiving a preview-selected item. The method also includes determining that a combination, of the preview-selected item and a set of one or more selected items, is invalid for a computation. The preview-selected item is not combinable with at least one selected item in the set of one or more selected items. The method further includes providing for display on an interface, a preview interface element associated with the at least one selected item such that an anticipated effect of executing a full selection of the preview-selected item is dynamically previewed.

In a second aspect of the present invention, a system for performing a method for dynamic validation of selectable data is provided. The system includes a display component for displaying an interface for receiving a selection of a preview-selected item. The display component is also configured for displaying an interface comprising a preview interface element associated with at least one selected item such that an anticipated effect of executing the selection of the preview-selected item is dynamically previewed. The system further includes a validation component. The validation component is configured for receiving the preview-selected item. The validation component is also configured for determining that a combination, of the preview-selected item and a set of one or more selected items, is invalid for a computation. The preview-selected item is not combinable with the at least one selected item in the set of one or more selected items. The validation component is further configured for providing for display on the interface, the preview interface element associated with the least one selected item.

In a third aspect of the present invention, one or more computer-readable media storing computer-useable instructions that, when used by one or more computing devices, cause the one or more computing devices to perform a method for interactive validation of multidimensional dataset analysis. The method includes receiving, based on a partial selection action, a dimension selection from a multidimensional dataset, wherein the partial selection action is associated with a reverse selection action and a full selection action. The method also includes determining that a combination, of the dimension selection and a set of one or more selected dimensions from the multidimensional dataset, is invalid for a computation. The determination is based on (1) determining a set of all combinations of dimensions in one or more cubes associated with the multidimensional dataset; (2) identifying a subset of the set of all combinations of dimensions, wherein the subset of the set of all combinations comprises combinations with the dimension selection; (3) identifying within the subset of all combinations of dimensions, one or more distinct dimensions, wherein each distinct dimension is present in each combination in the subset of the set of all combinations; and (4) identifying at least one selected dimension that is not combinable with the dimension selection, wherein the at least one selected dimension is not in the one or more distinct dimensions. The method further includes providing for display on an interface, a preview interface element associated with the at least one selected dimension such that an anticipated effect of executing the full selection action is dynamically previewed.

Figure 1:
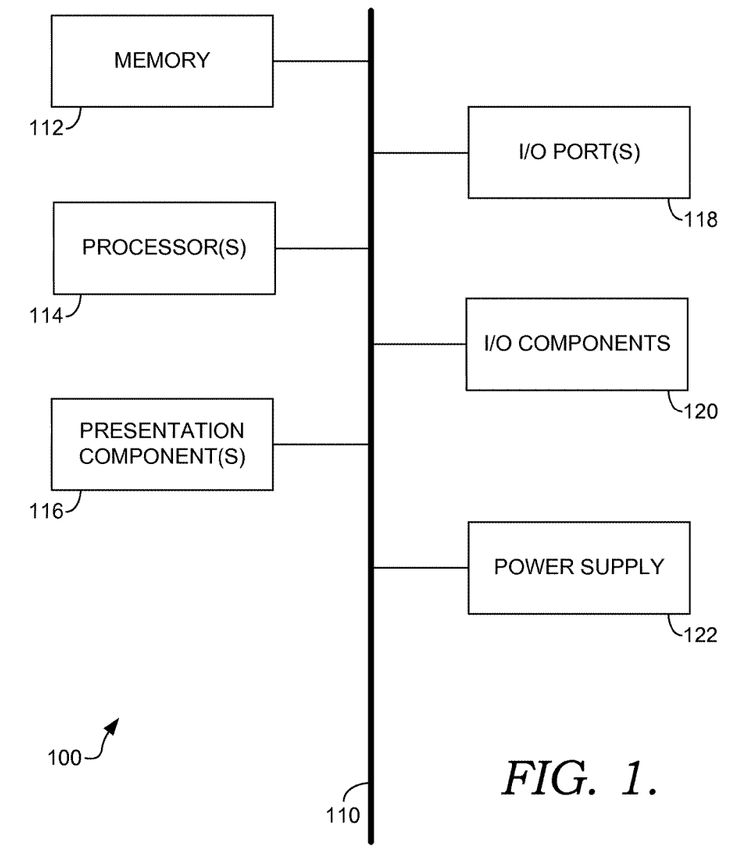
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
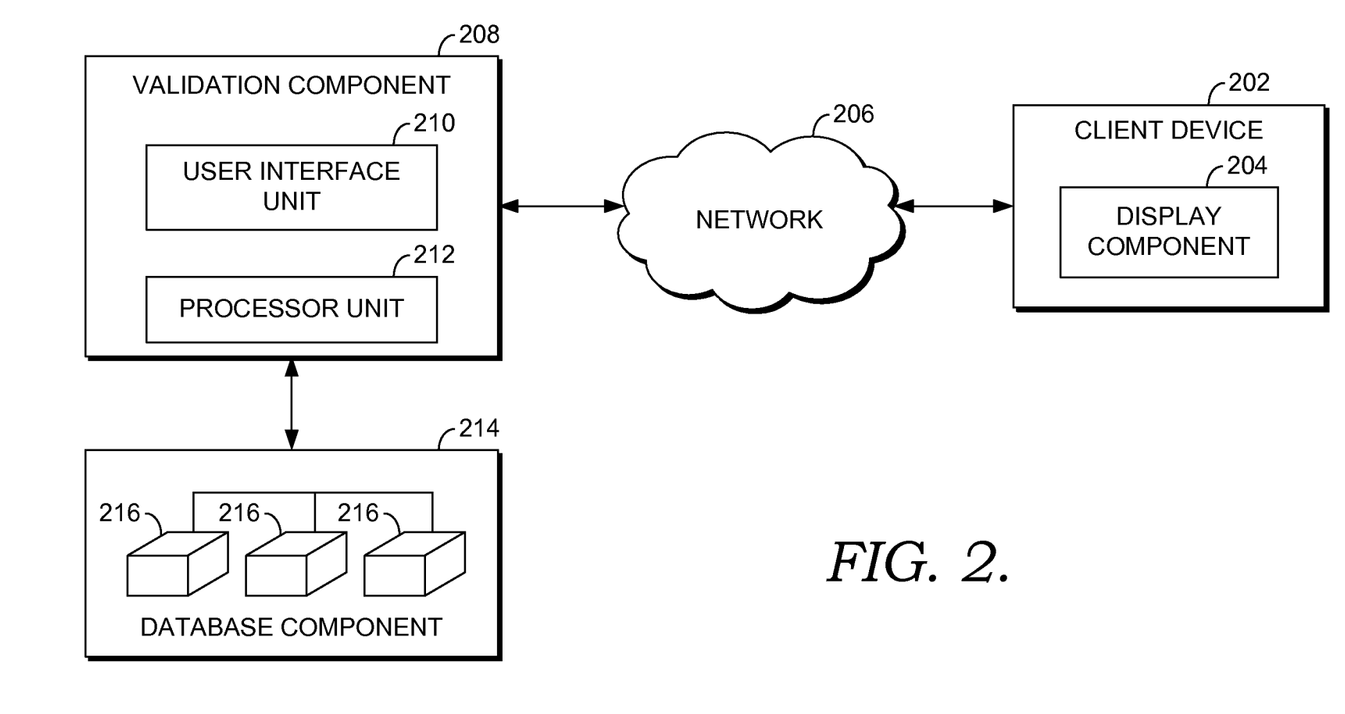
FIG. 2 is a block diagram of an exemplary network environment in which embodiments of the invention may be employed.

With additional reference to FIG. 2, a block diagram depicting an exemplary computing system 200 suitable for use in embodiments of the invention described. Generally, the computing system illustrates an environment in which the validation of selectable data with an interface is enabled. Embodiments of the present invention also provide systems and methods for the validation of selectable dimensions during data integration in a database system associated with a plurality of cubes. Among other components not shown, the computing system 200 generally includes a client device 202, a display component 204, a validation component 208 with a user interface unit 210 and a processor unit 212, a database component 214 with cubes 216, all in communication with one another via a network 206. The network 206 may include, without limitation, one or more local area networks (LANs) and/or wide area networks (WANs). Such networking environments are commonplace in offices, enterprise-wide computer networks, intranets and the Internet. Accordingly, the network 206 is not further described herein.

Any number of client devices, validation components, and database components may be employed in the computing system 200 within the scope of embodiments of the present invention. Each may comprise a single device/interface or multiple devices/interfaces cooperating in a distributed environment. For instance, the validation component 208 may comprise multiple devices and/or modules arranged in a distributed environment that collectively provide the functionality of the validation component 208 described herein. Additionally, other components/modules not shown also may be included within the computing system 200.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client device 202 may include any type of computing device, such as the computing device 100 described with reference to FIG. 1, for example. Generally, the client device 202 includes a display component 204. The display component 204 may be associated with an application, for instance, a database application, on the client device 202. The display component 204 provides a user interface to a user connected to the database component 214 through a client computing device. The display component 204 manages the operation and control of the interface features. The display component 204 may receive interface elements or interface instructions communicated over the network 206 and display the interface elements, based on the instructions, to the user through the client device 202. The display component 202 may display an interface for selecting data for a computation. In one embodiment, the user interface displayed by the display component 202 may be a configuration interface for identifying dimensions for performing database analysis.

The display component 204 is further configured to facilitate user interface interaction using control widgets and other interface elements. Control widgets may include selection lists, drop-down lists, combo boxes, and radio buttons used in selecting data for a computation. For example, a user may generate a custom report or filter data, based on selected dimensions and measures using selection options on the user interface. The display component 204 may receive selections from a user interacting with the displayed interface, and communicate the selections to the validation component 208. The selections may be based on partial selection actions, full selection actions, or reverse selection action. For example, the selection action may be a drag action, a drop action, or a return-drop action respectively. A selection may also be a mouse over, double-click, and a mouse off respectively. Any other variations and combinations of selection are contemplated within the scope of embodiments of the present invention. For example, in embodiments, the keystroke may be associated with each of a partial selection, full selection, or reverse selection. The selection may trigger the display of several different interface elements. In particular, interface elements may include a strikethrough, gray-out, highlight, caution signs, check marks and all such interface elements that distinguish different interface features from each other. The different interface elements may be associated with different outcomes of algorithms in the validation component.

The database component 214 is configured to manage the operation and access to database features. An exemplary database system may be the Online Analytical Processing (OLAP) database that facilitates business-intelligence queries using data integration. The database component 214 supports combining data residing in different sources and providing users with a unified view of these data. In embodiments, the data source may be a plurality of cubes (e.g., cubes 216) associated with the database component. The database component 214 may provide access to the cubes 216 that combine several different dimensions and measures. A cube may be a data structure that aggregates measures by levels and hierarchies of each dimension. Multidimensional cubes may be used in multidimensional data queries or the creation of reports. A user may generate custom reports to bring in relevant measures and dimensions from multiple cubes into one place. The database component 214 communicates with the validation component so that the validation identifies combinations of dimensions and measures that are valid and invalid for computations in data integration.

With continued reference to FIG. 2, the validation component 208 manages the user interface functions, with a user interface unit 210, and processing functions, with a processor unit 212, to dynamically indicate via the display component 204 the anticipated effect of the different selections. In particular, the user interface unit 210 and the processor unit 212 operate to identify interface elements to associate with a selected item that is affected by a user selection. An indication of an effect of a user selection may be based on processing a received selection and selecting an interface element associated with the determined outcome, to communicate to the display component 204. For example, the user may select an item that is communicated for processing; the item is then determined to be invalid for a computation with other previously selected items. The user interface unit 210 identifies an interface element associated with the determination and communicates the interface element to the display component 204 for display on the interface. Communicating the interface element may involve communicating instructions to the display component 204 on the interface element. In embodiments, the user interface unit 210 communicates the interface element or interface instructions along with additional relevant information of the determination from the selection that may also be displayed on the interface.

The processor unit 212 manages the step-by-step processing of user selections. The processor unit 212 may implement one or more algorithms based on the user selection and the associated multidimensional dataset. The processor unit 212 may receive one or more selections from the display component 204. The selection may be an input into the algorithm to determine whether the selection may be validly combined with a subset of other selections from a multidimensional data set. The processor unit 212 is responsible for operating the algorithms and tracking the different affected and unaffected items in the multidimensional dataset. The processor unit 212 may further function to communicate with the interface unit the determination for the selections received. The output from the algorithms and the interface elements associated with the outputs may be communicated to the display component 204 for display on the client device 202. In this regard, the validity algorithm and the interface elements are directly linked to the display component 204 such that the interface is intuitive, simple, and flexible in communicating information on the user selections from the multidimensional dataset.

With reference to FIG. 3, for exemplary purposes only, a sample algorithm for determining that a combination, of the preview-selected item and a set of one or more selected items, is invalid for a computation is provided. The algorithm may include identifying a selected dimension (X) moving from the set of available dimensions (available) to the set of dimensions in use (InUse). DimensionsToSave may be the set list of dimensions that will not receive a strikethrough interface element. DimensionsToRemove may be the list of dimensions that will be removed from InUse.

The dimensions in DimensionsToRemove list are associated with a strikethrough on the interface during a partial selection. DimensionsRemaining may be a list of temporary dimensions during the execution of the algorithm. C may denote the set of all combinations across all cubes associated with a database or a particular custom reporting session. C(X) may be a subset of C where X is a dimension. AllDistinctDimensions denotes the set of distinct dimensions found in all combinations in the subset of all combinations with X, i.e. C(X). As such during a partial selection action, the following algorithm may be executed:

```
Calculate C(X);
Calculate AllDistinctDimensions;
For each dimension, Y, found in InUse
{
    IF Y does not exist in AllDistinctDimensions;
    Then MembersToRemove.Add(Y);
}
    MembersRemaining = InUse − MembersToRemove;
    IF MembersRemaining is fully contained in a single list found in
    C(X);
{
    MembersToSave = MembersRemaining;
}
Else For each member, Z, found in AllDistinctDimensions
    {
        IF Z exists within each and every C(X) then add Z to the
        MembersToSave;
    }
MembersToRemove = InUse − MembersToSave
```

Figure 3A:
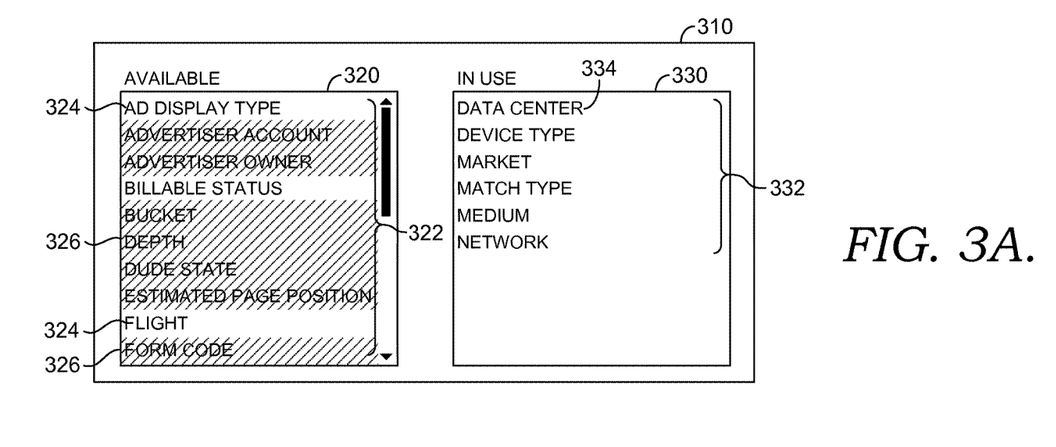
FIGS. 3A-3E are schematic diagram showing a method for dynamic validation of selectable data in accordance with embodiments of the present invention.
Figure 3B:
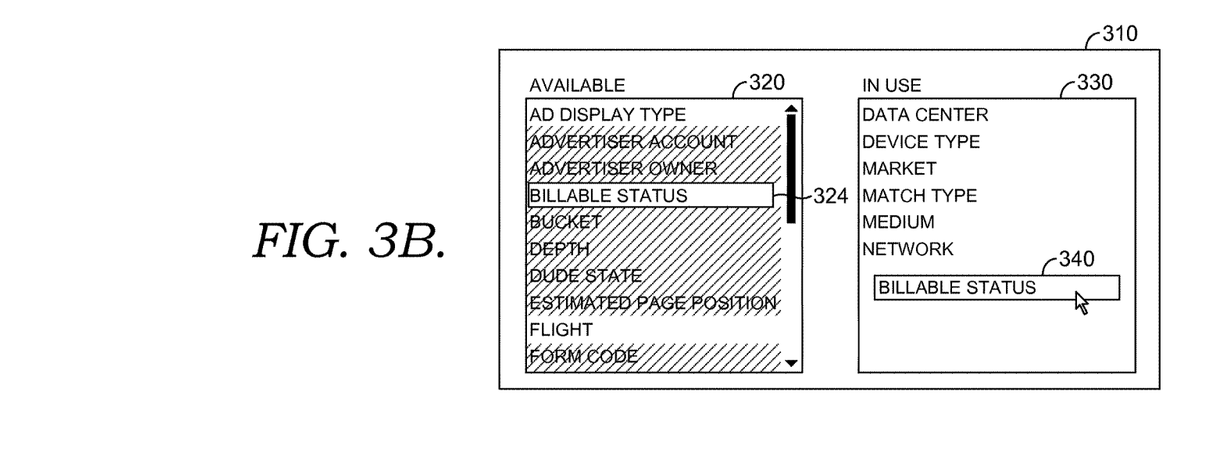
Figure 3C:
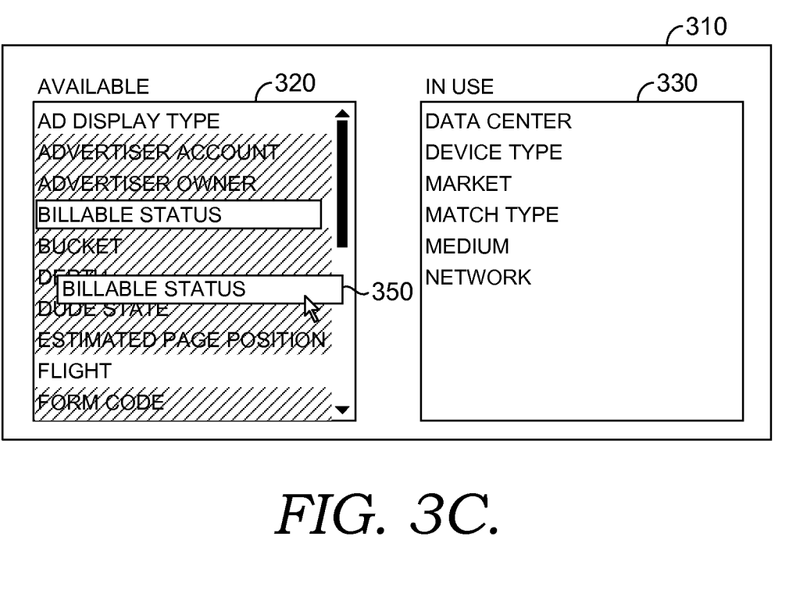

FIGS. 3A-3D depict, for exemplary purposes, an interface for validation of selectable data. The interface 310 illustrates a data integration configuration process of selecting dimensions associated with a plurality of cubes in a database system. A user may first, make a selection, then a valid or invalid combination determination is made, and as a result, the selected dimensions and unselected dimensions may be associated with interface elements. For example, FIG. 3A shows an available section 320 and an in-use section 330. In the available section 320, available-dimensions 322 are associated with two different interface elements, a regular-black element 324 (e.g., Ad Display Type) and a grayed-out element 326 (e.g., Form Code). The available-dimensions 322 associated with the regular-black element 324 are valid in combination with the in-use-dimensions 332, in this case, the in-use-dimensions 332 also displayed with a regular-black element 334 (e.g., Data Center). In FIG. 3B a user may make a selection. The selection may be based on a partial selection action 340 (e.g. a drag action) of a dimension (e.g., Billable Status) associated with a regular-black element 324. As previously discussed, the regular-black element 324 visually communicates to the user that the Billable Status dimension is valid in combination with the in-use-dimensions 332. In FIG. 3C, the user may make a selection based on a reverse selection action 350 (e.g., a return-drop action) that returns the Billable Status dimension to the available-dimensions 322 without executing a full selection action (e.g., drop action) of the Billable Status dimension.

Figure 3D:
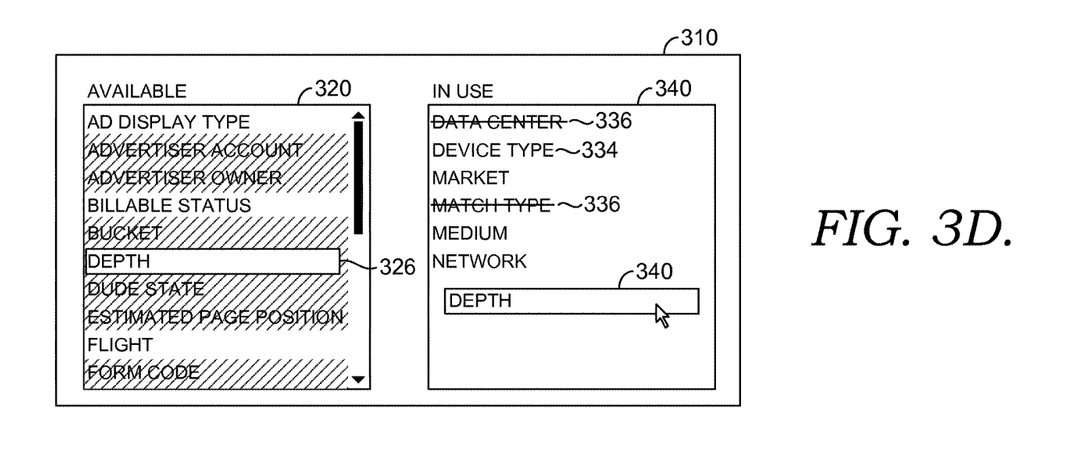
Figure 3E:
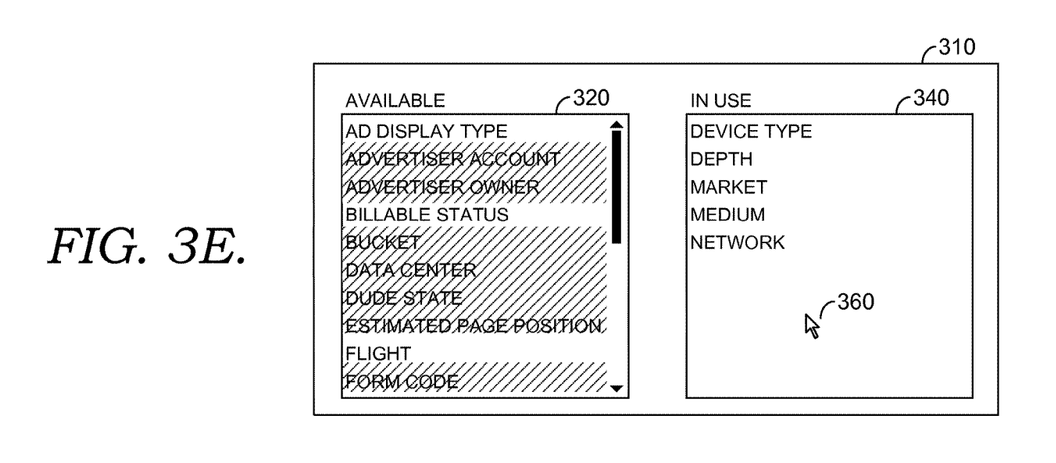

In FIG. 3D, the user may make a selection. The selection may be based on a partial selection action 340 (e.g. a drag action) of a dimension (e.g., Depth) associated with a gray-out element 326. As previously discussed, the gray-out element 326 visually communicates to the user that the Depth dimension is invalid in combination with the in-use-dimensions 332. As a result of selecting the Depth dimension, a determination is made to identify a dimension in the in-use-dimensions 332 that is not combinable with the Depth dimension. The determination may be made with, for instance, the algorithm described above. Data Center and Match Type are determined as not combinable with Depth. In this regard, Data Center and Match Type are displayed with a strikethrough element 336 to proactively and visually convey to a user the anticipated effect of the selection of Depth dimension. The user may make a reverse selection action 350 (e.g., return-drop action) and not trigger the anticipated effect of the selection. On the other hand, as shown in FIG. 3E, the user may make a full selection action 360 (e.g., drop action) that triggers the anticipated effect of the selection, and as a result, the Depth dimension is added to the in-use section 330. In addition, any in-use-dimensions 332 associated with the strikethrough element 336 are removed from the in-use section 330 to the available section 320. The dimensions (e.g., Data Center and Match Type) are displayed in the available section 320 with the gray-out element 326 to visually convey to the user that the dimensions are not a valid combination with the current dimensions in the in-use section 330. It is contemplated that upon completing selections for a computation, the user may then select an execution action to perform the computation for the selected dimensions.

As demonstrated in the exemplary scenario above, embodiments of the present invention support a direct manipulation interface in that the user interface involves continuous representation of interface elements of interests in rapid, reversible, and incremental actions and feedback. When a user makes a dimension selection from a list of available dimensions to drag and drop to a list of in-use dimension selections, the interface may simultaneously and/or automatically render an interface element (e.g., gray-out) on dimensions based on the outcome of determinations for the selection, the determinations facilitated by an algorithm. Rapid, incremental feedback allows the user to make fewer errors and complete tasks in less time because users can see the results of an action before completing the action, thus evaluating the output and compensating for mistakes.

Figure 4:
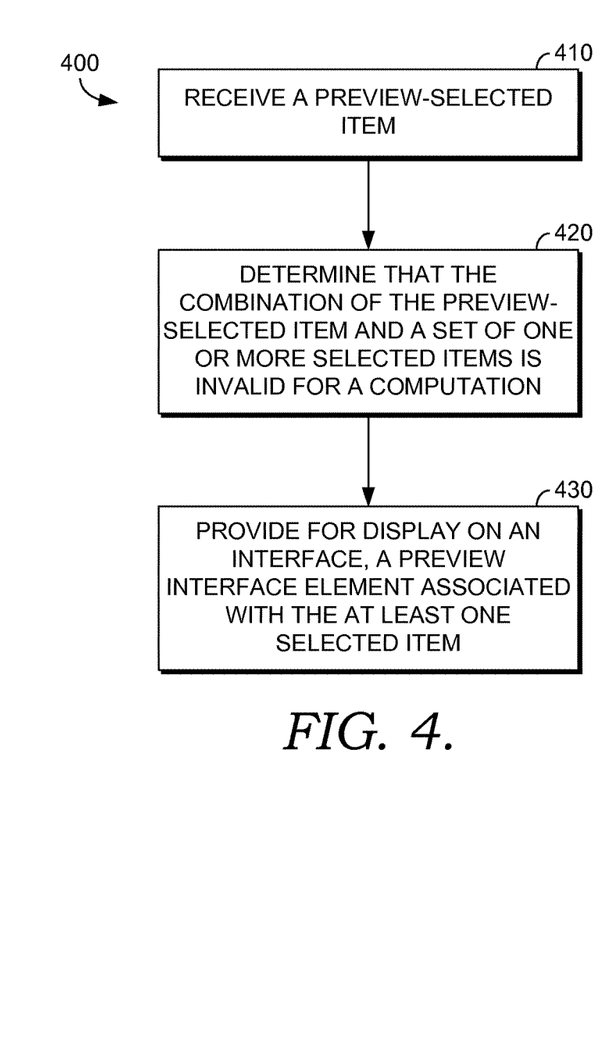
FIG. 4 is a flow diagram showing a method for dynamic validation of selectable data in accordance with embodiments of the present invention in accordance with embodiments of the present invention.

Turning now to FIG. 4, a flow diagram is provided that illustrates a method 400 for dynamic validation of selectable data. At block 410, a preview-selected item is received. The preview-selected item may be associated with a plurality of selectable items. At block 420, it is determined that a combination of the preview-selected item and a set of one or more selected items is invalid for a computation. In particular, the preview-selected item is determined not to be combinable with at least one selected item in the set of one or more selected items. At block 430, a preview interface element associated with the at least one selected item is provided for display on an interface, such that an anticipated effect of executing a full selection action of the preview-selected item is dynamically previewed. A user may decide to either make a reverse selection action and not execute the full selection action, which results in a dynamic removal of the preview interface element, or make a full selection action and execute the full selection action, which results in the one or more selected items provided for display without the at least one selected dimension.

Figure 5:
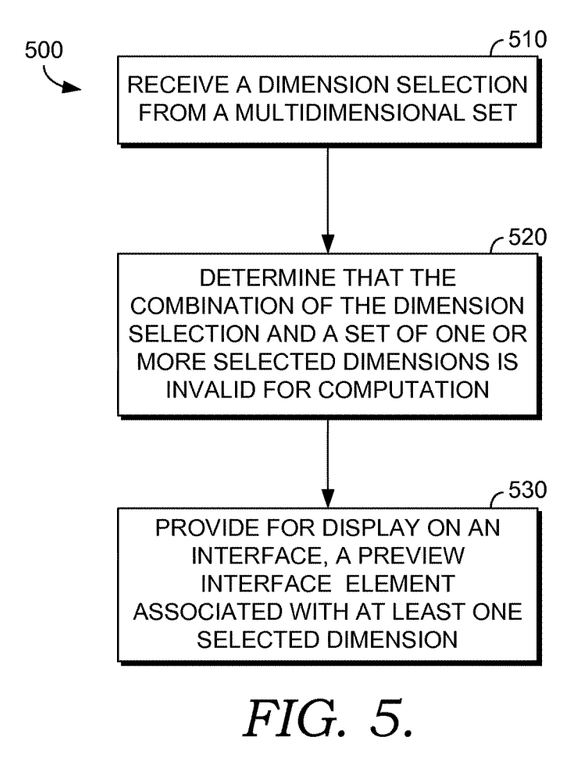
FIG. 5 is a flow diagram showing a method for dynamic validation of selectable data in accordance with embodiments of the present invention in accordance with embodiments of the present invention.

Turning now to FIG. 5, a flow diagram is provided that illustrates a method 500 for dynamic validation of selectable data. At block 510, a dimension selection from a multidimensional dataset is received. The dimension selection may be received based on a partial selection action, where the partial selection action is associated with a reverse selection action and a full selection action. The partial selection action may be a drag action, the full selection action may be a drop action, and the reverse selection action may be a return-drop action. At block 520, it is determined that a combination of the preview-selected item and a set of one or more selected items is invalid for a computation. In particular, a set of all combinations of dimensions in one or more cubes associated with the multidimensional dataset is calculated. A subset of the set of all combinations is identified, where the subset of the set of all combinations of dimensions includes combinations with the dimension selection. Within the subset of all combinations of dimensions, one or more distinct dimensions are identified. Each distinct dimension is present in each combination in the subset of the set of all combinations of dimensions. At least one selected dimension that is not combinable with the dimension selection is identified. The at least one selected dimension is not in the set of the one or more distinct dimensions. At block 530, a preview interface element associated with the at least one selected item is provided for display on an interface, such that an anticipated effect of executing a full selection of the preview-selected item is dynamically previewed.

In embodiments, one or more unselected dimensions may be compared with one or more selected dimensions to identify one or more unselected dimensions that are not combinable with the set of one or more dimensions. A second preview interface element may be associated with the one or more unselected dimensions that are not combinable with the set of one or more selected dimensions. A second dimension selection from the one or more unselected dimensions may be received, based on a partial selection action. The one or more the one or more unselected dimensions may not be combinable with the set of one or more dimensions. In embodiments, the preview interface element is a strikethrough interface element and the second preview interface element is a grayed-out interface element.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. One or more computer storage media storing computer-useable instructions that, when used by one or more computing devices, cause the one or more computing devices to perform a method for dynamic validation of selectable data, the method comprising:
receiving a preview-selected item;
determining that a combination of the preview-selected item and a set of one or more selected items is invalid for a computation, wherein the preview-selected item is not combinable with at least one selected item in the set of one or more selected items, wherein the determining is initiated by a partial selection action of the preview-selected item in association with the set of one or more selected items; and
providing for display on an interface, a preview interface element associated with the at least one selected item such that an anticipated effect of executing a full selection action of the preview-selected item is dynamically previewed, wherein the dynamic preview of the anticipated effect includes at least the preview interface element visually conveying invalid combinations of the preview-selected item and the set of one or more selected items.

2. The media of claim 1, wherein the preview-selected item is associated with a plurality of selectable items.

3. The media of claim 1, wherein receiving the preview-selected item is based on the partial selection action associated with the full selection action and a reverse selection action.

4. The media of claim 3, wherein the partial selection action is a drag action, the full selection action is a drop action, and the reverse selection action is a return-drop action.

5. The media of claim 3, further comprising:
receiving the reverse selection action for the preview-selected item;
executing the reverse selection action; and
providing for display on the interface, a dynamic removal of the preview interface element such that the full selection action of the preview-selected item is not executed.

6. The media of claim 1, wherein determining that the combination of the preview-selected item and the set of one or more selected items is invalid for the computation, further comprises:
identifying within the set of one or more selected items, one or more selected items that are combinable with the preview-selected item such that the one or more selected items are displayed without the preview interface element.

7. The media of claim 1, further comprising:
receiving the full selection action of the preview-selected item;
executing the full selection action of the preview-selected item; and
providing for display on the interface, the anticipated effect of executing the full selection action of the preview-selected item, wherein the set of one or more selected items are provided for display without the at least one selected item.

8. The media of claim 7, providing for display on the interface, further comprises providing from a plurality of selectable items, one or more selectable items that are not combinable with the set of one or more selected items, wherein the one or more selectable items are associated with a second preview interface element.

9. The media of claim 1, further comprising:
receiving an execution action to perform the computation comprising the set of one or more selected items.

10. A system for performing dynamic validation of selectable data, further comprising:
processor and a memory configured for providing computer program instructions to the processor;
a display component for:
displaying an interface for receiving a partial selection action of a preview-selected item; and
displaying the interface comprising a preview interface element associated with the at least one selected item such that an anticipated effect of executing a full selection action of the preview-selected item is dynamically previewed;
a validation component for:
receiving the preview-selected item;
determining that a combination of the preview-selected item and a set of one or more selected items is invalid for a computation, wherein the preview-selected item is not combinable with at least one selected item in the set of one or more selected items; and providing for display on the interface, the preview interface element associated with the least one selected item.

11. The system of claim 10, further comprising
the display component configured for:
displaying the interface for receiving a reverse selection action of the preview-selected item; and
displaying the interface comprising a dynamic removal of the preview interface element such that the full selection action of the preview-selected item is not executed;
the validation component configured for:
receiving the reverse selection action for the preview-selected item;
executing the reverse selection action; and
providing for display on the interface the dynamic removal of the preview interface element such that the full selection action of the preview-selected item is not executed.

12. The system of claim 10, further comprising:
the display component configured for:
displaying the interface for, receiving the full selection action of the preview-selected item; and
displaying the interface comprising the set of one or more selected items, without the at least one selected item;
the validation component configured for:
receiving the full selection action of the preview-selected item;
executing the full selection action of the preview-selected item, wherein executing the full selection action comprises removing the at least one selected item that is not combinable with the preview-selected item from the set of one or more selected items; and
providing for display on the interface, the set of one or more selected items, without the at least one selected item.

13. The system of claim 10, further comprising:
the validation component configured for:
identifying within a plurality of selectable items, one or more selectable items that are not combinable with the set of one or more selected items, such that the one or more selectable items are displayed with a second preview interface element.

14. The system of claim 13, further comprising:
the display component configured for:
displaying the one or more selectable items that are not combinable with the set of one or more selected items with the second preview interface element.

15. A method for dynamic validation of selectable data, the method comprising:
receiving, based on a partial selection action, a dimension selection from a multidimensional dataset, wherein the partial selection action is associated with a reverse selection action and a full selection action;

determining that a combination of the dimension selection and a set of one or more selected dimensions from the multidimensional dataset is invalid for a computation, based on:
determining a set of all combinations of dimensions in one or more cubes associated with the multidimensional dataset;
identifying a subset of the set of all combinations of dimensions, wherein the subset of the set of all combinations of dimensions comprises combinations with the dimension selection;
identifying within the subset of the set of all combinations of dimensions, one or more distinct dimensions, wherein each distinct dimension is present in each combination in the subset of the set of all combinations of dimensions; and
identifying at least one selected dimension that is not combinable with the dimension selection, wherein the at least one selected dimension is not in the one or more distinct dimensions; and
providing for display on an interface, a preview interface element associated with the at least one selected dimension such that an anticipated effect of executing the full selection action is dynamically previewed.

16. The method of claim 15, further comprising:
receiving an execution action to perform the computation comprising the set of one or more selected dimensions.

17. The method of claim 15, further comprising:
receiving the full selection action associated with the partial selection action of the dimension selection;
executing the full selection action of the dimension selection, wherein executing the full selection action comprises removing the at least one selected dimension that is not combinable with the dimension selection from the multidimensional dataset; and
providing for display on the interface, the set of one or more selected dimensions, without the at least one selected dimension.

18. The method of claim 17, further comprising:
identifying in the multidimensional dataset, one or more unselected dimensions that are not combinable with the set of one or more selected dimensions; and
providing for display on the interface, a second preview interface element associated with the one or more unselected dimensions that are not combinable with the set of one or more selected dimensions.

19. The method of claim 18, further comprising:
receiving, based on the partial selection action, a second dimension selection from one or more unselected dimensions, wherein the one or more unselected dimensions that are not combinable with the set of one or more selected dimensions.

20. The method of claim 18, wherein the preview interface element is a strikethrough element and the second preview interface element is a grayed-out element.

* * * * *